(12) United States Patent
Harwood et al.

(10) Patent No.: US 9,521,132 B2
(45) Date of Patent: Dec. 13, 2016

(54) SECURE DATA STORAGE

(71) Applicant: SILICON SAFE LIMITED, Cambridge (GB)

(72) Inventors: William Thomas Harwood, Cambridge (GB); Roger Alan Gross, Cambridgeshire (GB)

(73) Assignee: SILICON SAFE LIMITED, Cambridge (GB)

( * ) Notice: Subject to any disclaimer, the term of this patent is extended or adjusted under 35 U.S.C. 154(b) by 36 days.

(21) Appl. No.: 14/262,177

(22) Filed: Apr. 25, 2014

(65) Prior Publication Data
US 2015/0046998 A1 Feb. 12, 2015

(30) Foreign Application Priority Data

Aug. 8, 2013 (GB) .................................. 1314231.0

(51) Int. Cl.
*G06F 21/12* (2013.01)
*G06F 21/60* (2013.01)
(Continued)

(52) U.S. Cl.
CPC ............. *H04L 63/08* (2013.01); *G06F 21/121* (2013.01); *G06F 21/30* (2013.01); *G06F 21/60* (2013.01);
(Continued)

(58) Field of Classification Search
CPC ........ G06F 21/121; G06F 21/60; G06F 21/70; H04L 9/0877
See application file for complete search history.

(56) References Cited

U.S. PATENT DOCUMENTS 5,896,414 A * 4/1999 Meyer et al. ................. 375/222
5,987,232 A * 11/1999 Tabuki ............................ 726/5
(Continued)

FOREIGN PATENT DOCUMENTS

| WO | 01/52023 A2 | 7/2001 |
| WO | 02/01368 A2 | 1/2002 |

OTHER PUBLICATIONS

GB Search Report, dated Jan. 22, 2014 issued in priority GB Application No. GB 1314231.0.
(Continued)

*Primary Examiner* — Dede Zecher
*Assistant Examiner* — Jason C Chiang
(74) *Attorney, Agent, or Firm* — Saul Ewing LLP

(57) ABSTRACT

A method and apparatus for storing data and performing logical comparisons and other operations on said data, the results of said comparisons and operations reveal only limited information about the stored data. Stored data may include, but is not limited to, confidential information such as passwords, biometric data, credit card data, personal identifiers that uniquely identify an individual, authorization levels where an entity may make a claim to have a certain level of access right or authorization, votes cast in an election, and encryption keys. Control logic within the apparatus prevents direct access to the data store other than via a restricted command interface which prevents data from being revealed. For example, operations such as checking a putative password against a password in the data store is performed by the apparatus which returns a pass or fail, but does not reveal the stored password.

15 Claims, 5 Drawing Sheets

(51) Int. Cl.
  *G06F 21/70* (2013.01)
  *H04L 9/08* (2006.01)
  *H04L 29/06* (2006.01)
  *G06F 21/62* (2013.01)
  *G06F 21/79* (2013.01)
  *G06F 21/30* (2013.01)
  *H04L 29/08* (2006.01)

(52) U.S. Cl.
  CPC .............. *G06F 21/62* (2013.01); *G06F 21/70* (2013.01); *G06F 21/79* (2013.01); *H04L 9/0877* (2013.01); *H04L 63/0884* (2013.01); *H04L 67/02* (2013.01)

(56) References Cited

U.S. PATENT DOCUMENTS

| | | | |
|---|---|---|---|
| 6,195,696 B1* | 2/2001 | Baber et al. | 709/223 |
| 6,584,505 B1 | 6/2003 | Howard et al. | |
| 7,600,125 B1* | 10/2009 | Stringham | 713/176 |
| 2003/0035322 A1* | 2/2003 | Wong | 365/185.33 |
| 2003/0105725 A1* | 6/2003 | Hoffman | 705/75 |
| 2004/0165752 A1* | 8/2004 | Junginger et al. | 382/115 |
| 2004/0236719 A1* | 11/2004 | Horvitz | 707/1 |
| 2004/0264262 A1* | 12/2004 | Ishimoto et al. | 365/195 |
| 2005/0081045 A1 | 4/2005 | Nicodemus et al. | |
| 2005/0223241 A1 | 10/2005 | Nakai et al. | |
| 2007/0050635 A1 | 3/2007 | Popp et al. | |
| 2007/0174910 A1* | 7/2007 | Zachman et al. | 726/18 |
| 2008/0016334 A1* | 1/2008 | Kurapati | H04L 63/061 713/155 |
| 2008/0098231 A1* | 4/2008 | Martinez et al. | 713/176 |
| 2012/0082059 A1* | 4/2012 | Wang et al. | 370/253 |
| 2012/0266220 A1* | 10/2012 | Brudnicki et al. | 726/6 |

OTHER PUBLICATIONS

"Password:Safe" from Silicon Safe Ltd., retrieved from the Internet: URL: http://www.siliconsafe.co.uk/products.php [retrieved on Jan. 20, 2014].

* cited by examiner

SECURE DATA STORAGE

CROSS-REFERENCE TO RELATED APPLICATIONS

This application is based on, and claims priority to, Great Britain Application No. GB 1314231.0, filed Aug. 8, 2013, the entire contents of which being fully incorporated herein by reference.

FIELD OF THE INVENTION

The invention relates to processing of data to be kept secure from unauthorised access. More particularly, but not exclusively, it relates to an apparatus for carrying out operations on information associated with a plurality of users, and stored in a secure memory, in response to commands from an application server in order to allow the application server to authenticate a user.

BACKGROUND OF THE INVENTION

This patent specification describes not only various ideas and functions, but also their creative expression. A portion of the disclosure of this patent document therefore contains material to which a claim for copyright is made and notice is hereby given: Copyright Silicon Safe Limited 2013 and 2014 (pursuant to 17 U.S.C. 401). A claim to copyright protection is made to all protectable expression associated with the embodiments of the invention illustrated and described in this patent application.

The copyright owner has no objection to the facsimile reproduction by anyone of the patent document or the patent disclosure, as it appears in the Patent and Trademark Office patent file or records, but otherwise reserves all copyright rights whatsoever. No express or implied licence under any copyright whatsoever is therefore granted.

The need for the secure storage of confidential data arises for example, when it is necessary to store computer passwords. A password is a secret word or string of numbers and or characters that is used to prove identity to gain access to a computer or resource. The password should be kept secret from those not allowed access and must therefore be stored in a secure data store. This store is conventionally a password file that is intended to be accessed by an authentication system but nobody else.

Password files are a honey-pot for computer hackers to target, which if not secured properly, can leave a computer or network vulnerable to compromise. At the present time, one of the most common forms of cyber-attack in the commercial world is to steal password files. Typically, a web site is infiltrated over the internet (or via a Worm or Trojan horse program installed inside the network) by exploiting known vulnerabilities and the password file is stolen. Passwords are then used for a variety of mischievous and criminal activities.

Loss of password files not only causes huge inconvenience to both organisations and individual users (as users are required to reset their passwords) but also raises questions about the systems vulnerability in the future, because of uncertainties as to what extent users have indeed used fresh passwords (e.g. a user who's password was jjj5 may simply change it to jjj6).

In addition there is a significant issue of collateral damage to the security of other systems because of user's tendencies to use few distinct passwords across different systems from social media web sites to online shopping web sites. Moreover, a problem of password file theft is that although one sometimes knows when it has happened, one cannot be certain that it hasn't happened. As a consequence the first time one might discover it has taken place is at the point of a massive compromise of the system.

A person of ordinary skill in the art will be aware of various prior art methods to secure password files and their contents including the most common of these which is saving an encoded version of the original plain-text password called a password hash, or saving the hash of a salted password.

Unfortunately the development of hash chains and rainbow tables, which are methods of decoding an encoded password back to their original plain-text, have made both of these measures inadequate. It is therefore essential that the password store itself cannot be compromised or stolen in the first place.

The present invention addresses the above vulnerabilities and also other problems not described above.

SUMMARY OF THE INVENTION

According to the invention, there is provided apparatus comprising: an interface configured to receive messages from and transmit messages to an application server that uses the apparatus for protecting data associated with a plurality of users from unauthorized access, and a processor configured to perform a limited number of pre-determined operations on information stored in a memory, the information comprising data, associated with a plurality of independent users, to be kept secure from unauthorized access, wherein the interface is configured to receive a message from the application server that comprises data associated with one of the plurality of independent users, the data having been received by the application server from another device, wherein the processor is configured to perform an operation on the information in the memory, comprising comparing the received data against the secure data stored in the memory, and to provide a response to the application server, via the interface, based on the comparison, and wherein the limited number of pre-determined operations do not include providing the secure data stored in the memory to the application server.

The apparatus may further comprise a memory that stores the information associated with the plurality of independent users. The processor and memory may be provided as a single integrated circuit. Alternatively, the memory may for example be a separate device connectable to the apparatus. The memory may be arranged to be accessible to the processor only. The apparatus may comprise a connection between the processor and the memory and the connection may provide the only connection to the memory.

The invention therefore provides a concealed or private memory for the storage of credential information that is only accessible by a specific processor. The processor may be a local processor.

The processor is separate from the processing logic of the application server and ensures that the data in the memory is securely stored in that all interactions with the data in the memory necessary for the application server to carry out its tasks will be carried out through the limited operations provided by the processor. Attacks on the application server to steal secret data associated with the plurality of users will be unsuccessful since the secret data is stored in the concealed memory and the processor of the apparatus ensures that the processing logic of the application server cannot access the secret data.

The processor may compare the received data directly against the stored data. Alternatively, the processor may process the received data before comparing it against the stored data. The comparison may include, but is not limited to, equality matching, statistical matching, transformation matching or validation matching. The validation matching may comprise using stored data to check a digital signature of the received data.

The information stored in the memory may comprise indices and data associated with each index and the processor may be configured to perform the limited number of pre-determined operations on the information by using the indices.

The information stored in the memory may comprise user ids and authentication data associated with each user id for authenticating a user and the application server may be an authentication server arranged to authenticate a user based on responses from said apparatus.

The information stored in the memory may comprise user ids and one or more out of passwords, biometric data and pins associated with said user ids for one or more external resources and the application server may be configured to permit or reject access to said one or more external resources based on responses from the apparatus.

The information stored in the memory may comprise lottery ticket identification numbers and purchaser identification information registered at the time of purchase of the lottery ticket.

A user could be a person or a personal device but a user does not necessarily need to be associated with a person. For example, in some embodiments, the plurality of independent users could be a plurality of data recording devices, such as sensors, and the application server may be used by the devices to check that the data received indeed originates from a given device. The plurality of independent users could be a large number of users, e.g. hundreds of thousands or hundreds of millions of users, depending on the particular implementation and application. Alternatively, the plurality of users could be a small number of users.

The processor may be arranged not to be programmable in run-time.

The processor may not be programmable or modifiable in use. In other words, once deployed it may not be possible to remotely download programs into the processor, or otherwise remotely modify the processor, to cause it to perform a different task, or modified task.

The processor may be configured to only accept messages from said application server up to a predetermined length and to reject or truncate input messages that are larger than said predetermined length.

The limited number of predetermined operations may comprise an operation to update the secure data in the memory. The apparatus may receive the new data with which to update the memory from the application server.

In some embodiments, the processor may provide a limited, specific interface to the outside world that only allows the operations of storing, comparing, updating and deleting data and additional management functions that do not affect or disclose data.

The processor may be configured to provide results of the limited number of operations to the application server, via the interface, and the results may be limited to success, failure or information about an error condition.

Segregation between different aspects of processing, such as, but not limited to protocol handling, encryption and decryption, or backup may be provided in the processor by implementing such processes in separate physical processing units that communicate between one another using an internal messaging system where the separate processors do not share memory.

The processor may be implemented as a Harvard architecture processor, a special purpose field programmable gate array (FPGA) or application specific integrated circuit (ASIC) processor that prohibits code injection attacks against the processor.

The apparatus may be configured to securely backup secure data to additional internal storage or to external storage using private network connections or encrypted network connections. Consequently, in some embodiments, the apparatus may further comprise a back-up memory.

The interface may provide a first interface and the apparatus may further comprises a second interface for providing information to an external back-up device and the processor may be configured to provide secure data to the back-up device via the second interface. The secure data may be provided to the back-up device in encrypted form. The back-up device may be another apparatus as defined above, a private network or other secure memory.

The memory may comprises flash memory organized as a hash table for storing the secure data, the flash memory being organized as a single uniform space of blocks, each of which accommodates a user profile.

The memory may be configured to store data and meta data associated with a user profile in the same block of the uniform space of blocks. By using a flash memory that allows single block writes, removing the need for secondary tables of meta data, write and read times are improved, the life time of the memory is extended and the risk of data inconsistency is reduced.

The user profile may comprise user identity data, credentials and meta data associated with the user identity and possibly additional rarely changing data associated with the user identity.

According to the invention there is also provided a system comprising the above defined apparatus and an application server that uses the apparatus to store data associated with a plurality of users, the application server being configured to receive data from a plurality of devices associated with the plurality of independent users and to send data received from the plurality of devices to the apparatus for comparison against data stored in the memory. The application server may provide shared resources to one or more applications in a client server network.

The system may provide an encrypted connection between the apparatus and the application server.

The system may further comprise a pre-server providing an intermediary between the plurality of devices and the application server, the pre-server being configured to rewrite data received from a device of the plurality of devices, to be compared against data stored in the secure memory, before forwarding the re-written data, in place of the data received from the device, to the application server, the pre-server being configured to re-write the data by one out of encrypting the data, rewriting the data to a temporary tag and communicating the tag and data to the apparatus out of channel, while only forwarding the tag to the application server, or rewriting the data to a hash value using a key shared between the pre-server and the apparatus. The processor may be configured to recover the original data from the re-written data and compare the recovered data to the secure data stored in the memory.

According to the invention, there is also provided a computer implemented method comprising: receiving in an apparatus a message from an application server that uses the apparatus for protecting data associated with a plurality of users, the message comprising data received by the application server from another device; carrying out an operation on information stored in a memory in response to the message, the information comprising data associated with the plurality of independent users, to be kept secure from unauthorized access; and providing a response to the application server based on the comparison, wherein the operation is one out of limited number of pre-determined operations that a processor of the apparatus can carry out on information in the memory.

The limited number of pre-determined operations may include updating the secure data and the method may further comprise receiving a message from an application server with data to be protected from unauthorized access and updating the memory with the received data.

The method may further comprise providing the secure data in encrypted form to an external back-up device via an interface that is separate from an interface over which messages are exchanged with the application server.

The method may further comprise, in response to receiving a message longer than a pre-determined length, rejecting or truncating the message.

According to the invention, there is also provided a computer program comprising instructions that, when executed by a processor, cause the processor to: receive and interpret a message received via an interface from an application server configured to use an apparatus comprising the processor to protect data associated with a plurality of users, the message comprising data received by the application server from another device; carry out a limited number of predetermined operations on information stored in a memory accessible by said processor only, the information comprising data associated with the plurality of users to be kept secure from unauthorized access, wherein the limited number of operations comprises comparing data based on the received data against secure data stored in the memory; and provide a response back to the application server, via the interface, based on a result of an operation of the limited number of predetermined operations, wherein the limited number of operations do not include returning secure data to the application server.

According to the invention there is also provided a non-transient computer readable medium having the computer program stored thereon.

According to the invention, there is also provided a system for protecting data to be kept secure from unauthorized access, comprising: an application server for receiving data from a client device to be compared against data stored in a secure memory, the stored data being associated with a plurality of users, the secure memory forming part of the application server or forming part of an device external to the application server and protecting the stored data at rest, and a pre-server forming an intermediary between a client device and the application server, the pre-server being configured to rewrite data received from the client device, to be compared against the data in the secure memory, and forward the re-written data to the application server, instead of the actual data received from the client device, in order to also protect the data in use. The pre-server may be configured to re-write the data by one out of encrypting the data, rewriting the data to a temporary tag or rewriting the data to a hash value using a key shared between the pre-server and the apparatus. The system may also comprise a processor for comparing the data from the client device with data stored in the secure memory and the processor may be configured to recover the original data from the re-written data before carrying out the comparison.

According to the invention, there is also provided a pre-server for use, or residing, in a system as described above, the pre-server being configured to re-write data received from a client device and forward the re-written data to the application server.

Yet further, according to the invention, there is also provided a memory for storing credentials data for authenticating a user device, comprising flash memory organized as a hash table, the flash memory comprising a single uniform space of blocks, each of which accommodates a user profile.

Each block may store user identity data, credentials data and meta data associated with the user identity. Consequently, when the profile needs to be updated, only a single block write operation may be required.

According to the invention, there is also provided a method of using a flash memory to store user credentials, the flash memory being organized as a hash table and comprising a single uniform space of blocks, each of which accommodates a user profile, wherein the method comprises storing both data and meta data associated with a user profile to a single block of the uniform space of blocks and carrying out a single block write operation in response to a command to update the user profile.

By using a structure where data and meta data for a user profile is written in a single block, and which therefore does not require separate secondary tables to be updated, read/write performance is improved, the risk of data inconsistency is reduced and the life of the flash memory is extended.

According to the invention, there is also provided a comparator store that provides a means for an application server to store secret information and perform selected operations upon the secret information, and obtain the results of those operations, whilst maintaining the secrecy of the information in the sense that, once stored, the secret information is not directly obtainable from the comparator store by the application server.

The secret information is permitted to be stored and when other information is compared to the stored secret information the comparator store may only reveal the success or failure of the comparison; or, if desired, additionally a limited amount of information about the reason for a failure.

The secret information may be maintained either by ensuring there are no means of reading secret information from the comparator store, or by ensuring that any secret information read from the comparator store is in encrypted form with encryption keys stored within the comparator store.

In some embodiments, the operations that can be performed upon the secret information cannot be altered by the application server, indeed these operations are predefined at the time of installation of the device.

The comparator store may allow application specific means of comparison between secret stored information on the comparator store and information provided by the application server.

The comparator store may provide a means for an application server to update secret information stored in the comparator store provided that the application server can prove knowledge of specific secret information already stored on the comparator store and that such proof of knowledge of information is 'up to' the precision of the application specific information comparison carried out by the comparator store.

The comparator store may provide a means for an application server to erase secret information stored in the comparator store provided that the application server can prove knowledge of specific secret information already stored on the comparator store and that such proof of knowledge of information is 'up to' the precision of the application specific information comparison carried out by the comparator store.

The comparator store may provide for fault tolerance by supporting redundant storage within the comparator store.

The comparator store may support a plurality of said comparator stores to be used simultaneously in a system to achieve fault tolerance.

The comparator store may provide means for backup of secret information by supporting isolated and encrypted backup of said information stored in the comparator store.

The comparator store may provide a means of validating the integrity of its transmission responses to an application server by supporting digital signing of information transmitted from the comparator store.

The comparator store may provide a means of maintaining the secrecy of information transmitted from the comparator store to an application server by supporting encryption of information transmitted from it.

The comparator store may provide a means of connecting to a plurality of application servers and a means of receiving a plurality of requests from said of application servers.

The connection means may provide a means of pairing a plurality of requests to a corresponding plurality of replies by means of use of identifiers in message requests from said application servers, such that said identifiers are incorporated into the corresponding replies to said requests made by the comparator store back to an application server.

The connection means may provide a means to support a plurality of different protocols between the application server and the comparator store.

The protocol means may provide a means to support simultaneous connection of said protocols between the application server and the comparator store.

The comparator store may provide a means to support a plurality of different protocols between its Nanowall component and its storage component.

The protocol may provide a means to support simultaneous connection of said protocols between its Nanowall component and its storage component.

The connection means may provide a means to prevent buffer overflow attacks.

The comparator store architecture may provide a means to prevent code injection attacks.

The comparator store architecture may provide a means to prevent stack smashing attacks.

The comparator store may provide a means by which a general purpose computer used as a web server, game server, database server or as some other computational and/or storage resource, may store a collection of secret information in such a way that not is not possible for a person lacking physical access to the comparator store to obtain that collection of secret information from the comparator store.

The comparator store may provide a means by which stored secret information may be associated with meta data that records how the stored secret information may be used by the different operations provided by the comparator store and that in particular, the meta data may indicate whether or not the stored secret information is available, or not, to a particular operations.

The meta data may be dynamically modified by operations of the comparator store.

The comparator store may provide a means to derive challenge bounds from stored secret information.

Embodiments of the present invention therefore provide a method and apparatus for the secure storage of data under associated indices and supports the performance of operations on the stored data by use of the said indices in such a manner that the results of the operations reveal only limited information about the stored data.

BRIEF DESCRIPTION OF THE DRAWINGS

Embodiments of the invention will now be described, by way of example, with reference to the accompanying drawings. Throughout the description we shall refer to the following drawings.

DETAILED DESCRIPTION OF THE INVENTION

Figure 1:
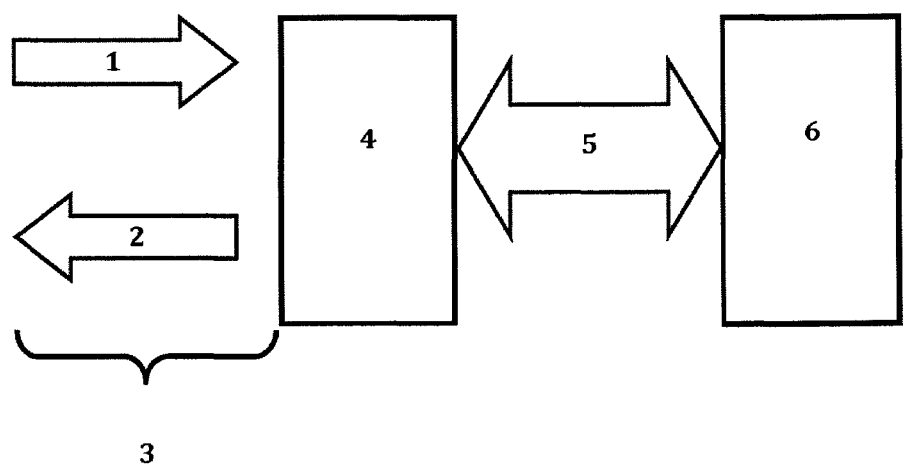
FIG. 1 is a schematic diagram describing the main components of an apparatus according to some embodiments of the present invention.

With reference to FIG. 1, an apparatus for securely storing information is shown. The apparatus comprises a front-end interface 3, for receiving messages 1 to the apparatus and providing responses 2, and a processor 4 for carrying out a number of operations. The apparatus of FIG. 1 also comprises a memory 6 for storing information associated with a plurality of users. The information comprises data that is secret or confidential, such as, but not limited to, password, biometric and pin data, which is to be kept confidential from those not allowed access to the data. The apparatus also comprises a back-end interface 5 used by the processor to carry out operations on the information in the memory. The processor can be a device, one or more components or logic arranged to process data and may be implemented as fixed hardware or as a combination of hardware or software. The processor may comprise logic, program memory and data memory with instructions stored in the program memory. The front-end interface 3 provides a front-end protocol for allowing the apparatus to receive commands 1 and provide responses 2. The back-end interface 4 provides a back-end protocol for allowing the processor to access the memory 6. The memory is accessible by the processor only. In other words, a person lacking actual physical access to the memory can only interact with the memory through the processor 4. The processor is pre-programmed to only carry out a limited number of operations on the secret information in the memory. Moreover, in some embodiments the processor cannot be re-programmed in use. The processor thereby provides secure storage of data by protecting the data stored in the memory.

The apparatus is connectable to an application server that may use the apparatus to protect secret data associated with a plurality of independent users. The application server may for example use the apparatus to authenticate users and/or control access by a user to a resource. The processor is configured to interpret and execute commands 1 received from the application server via the front-end interface 3 and to provide responses 2 back to the application server via the front-end interface 3. The limited operations that the processor is configured to carry out do not include returning secret data to the application server. Instead, the apparatus may receive secret data in a message 1 from the application server, compare the received secret data to secret data stored in memory and return a response 2 based on the comparison. The response may indicate that the secret data was matched or validated but will not include the secret data itself. If the comparison of the received data with the stored data was not successful the response may indicate that the apparatus failed to match the data and it may also provide limited information about the reason for failure. The apparatus may also update the data stored in memory with new data received from the application server.

The apparatus will hereinafter at times be referred to as a "comparator store", the processor as a "Nanowall" and the memory as a "store device", "storage device' or a "data store". Throughout we will use the term application server to mean a device connectable or connected to the comparator store that is using the comparator store for protecting secret information. The term application server in no way implies a particular form of device, such as a general purpose computer, or a particular mode of use, beyond that stated here. The application server may provide shared resources to one or more applications on client server networks. The application server may for example be a server for hosting applications in the cloud. It may additionally or alternatively provide and manage connections to other servers and/or databases. As suggested above, this could include managing access to resources to which a user device requests access. The application server includes, but is not limited to, a web server, a directory server, an authentication server or an identity server. The application server may be configured to communicate with a plurality of devices. The application server may for example be configured to receive and transmit data to the plurality of devices over a data communication network such as the internet. The application server receives data from the devices that it then forwards to the comparator store for the comparator store to compare to secret data stored in memory. The comparator store is used by the application server to protect data associated with the plurality of users and may not belong to, or be associated with, any particular one of the users. The comparator store may not be a user device or a personal device but may be used in a system to store information associated with a plurality of independent users.

Additionally, the comparator store can be provided as a physically separate device in its own housing or as a separately physical entity within the same housing as the application server as will be described in more detail below. The application server would comprise its own processing logic and memory separate from the comparator store. The one or more processors and memory of the application server may be separate from the comparator store in the sense that they may be provided on a different chip to the chip of the comparator store. Alternatively, they could be provided on the same silicon device but the processing logic of the application server and the processing logic of the comparator store would be physically distinct logic and the memories of the application server and the comparator store would also be physically distinct. For example, a client server network including the presence of a comparator store may be implemented on a single board or a single silicon device, a system on a chip (SOC), or a client server network on a chip. However, neither the processors nor the memories will be shared but instead provided as distinct physical logic and memories on the chip.

In FIG. 1, a generic example of a comparator store of some embodiments of the present invention is shown and is distributed throughout the hardware of FIG. 1.

The hardware in FIG. 1 comprises the Nanowall 4 which contains the domain specific logic for interpreting and executing commands sent to the device; and the Store Device 6 where data resides. Data is transferred between the Nanowall and the Store Device using the Back-End Protocol supported by the back-end interface 5. The front-end interface 3 supports a Front-End Protocol that defines the format of inward operation request messages 1 and outward reply messages 2, which are limited to succeed and fail responses, and which are the means by which an external system, for example a web server, sends commands to, and receives results from, the comparator store.

Figure 2:
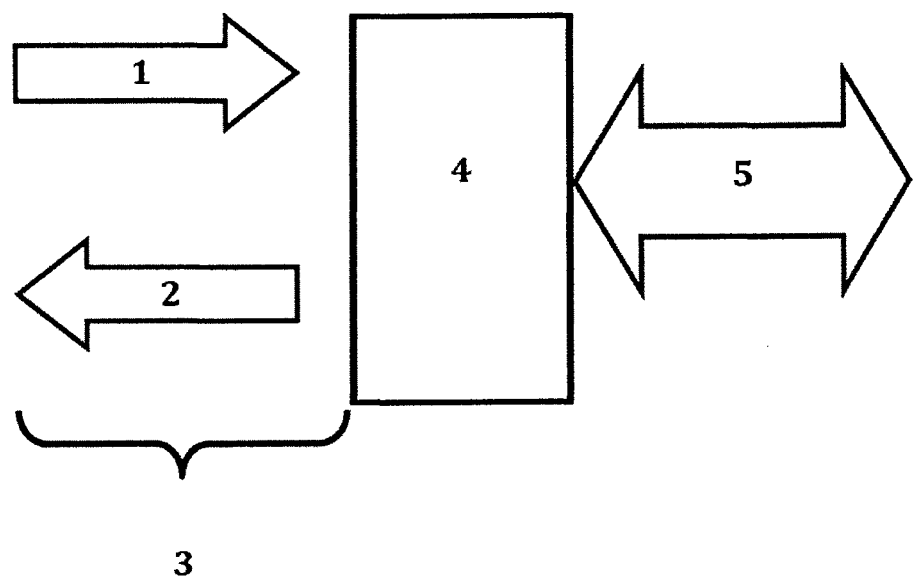
FIG. 2 is a schematic diagram describing components of an apparatus according to other embodiments of the present invention that uses a private storage network as the secure data store.

FIG. 2 describes a realisation of other embodiments of the present invention in which a variation of the architecture of FIG. 1 is shown. In FIG. 1 and FIG. 2 like reference numerals designate like components. However, in this realisation, a private storage network is used as the Data Store. In this realisation, a simplified comparator store may take on the structure indicated in which the comparator store becomes simplified to the Nanowall interface bridging the application domain and the storage network.

The comparator store is a separate physical entity to the processing logic and memory of the application server. The comparator store may be implemented on a separate chip to the main processing logic and memory of the application server. The comparator store may be a physically separate device in its own housing. The application server may be remote from the device and the device may for example be connectable to the application server using a remote connection. The comparator store may be connectable to the application server using an Ethernet connection. Alternatively, the comparator store may form a separate physical entity within the application server. In that case, the comparator store may be connected by a bus, for example a peripheral component interconnect bus (PCI-bus) or an internal universal serial bus (USB), to the main processing logic of the application server. In some embodiments, the connection between the comparator store and the application server not be a local bus in the sense that it may not be provided on the same chip as the comparator store. In other embodiments, the application server and the comparator store may be provided on the same chip, but the logic and memory of the comparator store are physically distinct from the logic and the memory of the application server in order to ensure that the storage of the secret data is secure.

In the implementation shown in FIG. 1, the processor 4 and the memory 6 would typically be provided in the same housing. Furthermore, the comparator store may be implemented as an integrated circuit comprising the processor 4 and the memory 6. However, in the implementation shown in FIG. 2, the memory may be separate from the comparator store and may be provided as a separate memory in its own housing. Alternatively, the memory may form part of the comparator store and be provided in the same housing as the processor of the comparator store but not as part of the same integrated circuit. In the description below, a reference to a memory, data store or store/storage device 6 is reference to a memory forming part of the comparator store, as shown in FIG. 1 or a memory connectable to the comparator store as shown in FIG. 2.

As indicated above, the interface between the application server and the comparator store may comprise an interface in the application server, an interface in the comparator store and the connection between the two interfaces and software and protocols for managing communication. Front-end interface 3 of the comparator store will hereinafter be used to refer to the interface located in the comparator store, including hardware and/or software, for communicating with the application server. When the comparator store is provided within a separate housing to the housing of the application server, the front-end interface 3 may be located within the housing of the comparator store. The interface between the processor 4 and the memory 6 may comprise an interface for the processor, and interface for the memory, the connection between the two interfaces and software and protocols for managing communication. Back-end interface 5 will hereinafter be used to refer to the components of the back-end interface that are provided in the comparator store and, when the memory is a separate device, may only comprise the interface at the processor side, within the housing of the comparator store, and not the connection to the memory or the interface within the separate memory device.

The memory 6 is configured to store a plurality of indices and data associated with the indices. At least some of the data in the memory is data to be kept secure from unauthorised access. The data stored under the indices may include, but is not limited to, passwords, biometric data pins or other identifying data for a user, credit card information or voting information. The memory stores secure, or 'secret', information about a plurality of users and may store one index for each user. The index may be the name or user id for the user. Alternatively, the index may be a computationally generated string of data and/or numbers, for example a secure hash value, and the user id may be stored as data associated with that index. For example, the data stored under each index may include a user id and the password or other identifying information for the user associated with the index.

The operations that can be performed on the indices and the secret data will be described in more detail below.

Figure 3:
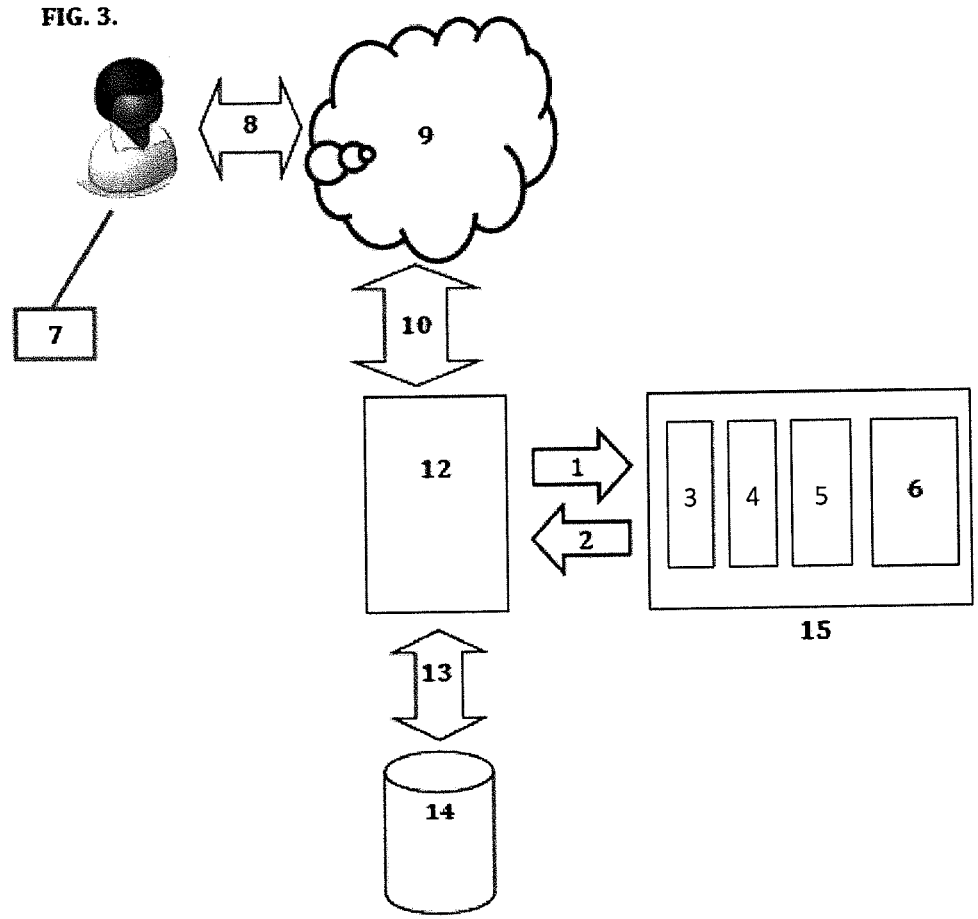
FIG. 3 is a diagram describing a realisation of an embodiment of the present invention that is a password safe which interfaces to a web server.

The diagram FIG. 3. depicts a deployment of the comparator store as a 'password safe' as part of a web application. In this deployment a user with a user device providing a web browser, depicted as 7, connects to the internet 9 using the HTTPS protocol over link 8, which ultimately connects, still using HTTPS over link 10, to a web server 12. The web server utilises web pages stored on storage device 14 that it accesses over protocol 13. The web server uses the comparator store (labelled 15 and comprising of individual components labelled 3 to 6 in the implementation of FIG. 1) to validate the password supplied by the user before granting access to the stored web pages. In FIG. 3 messages labelled 1 and 2 designates messages received and transmitted by the front-end interface 3 of the comparator store 15. It will be realised that although the comparator store in the system of FIG. 3 has been described to comprise the individual components labelled 3 to 6 in the implementation of FIG. 1, the comparator store could alternatively comprise of individual components labelled 3 to 5 in the implementation of FIG. 2 and the system of FIG. 3 would then also comprise a separate private network for storing the secure data.

Figure 4:
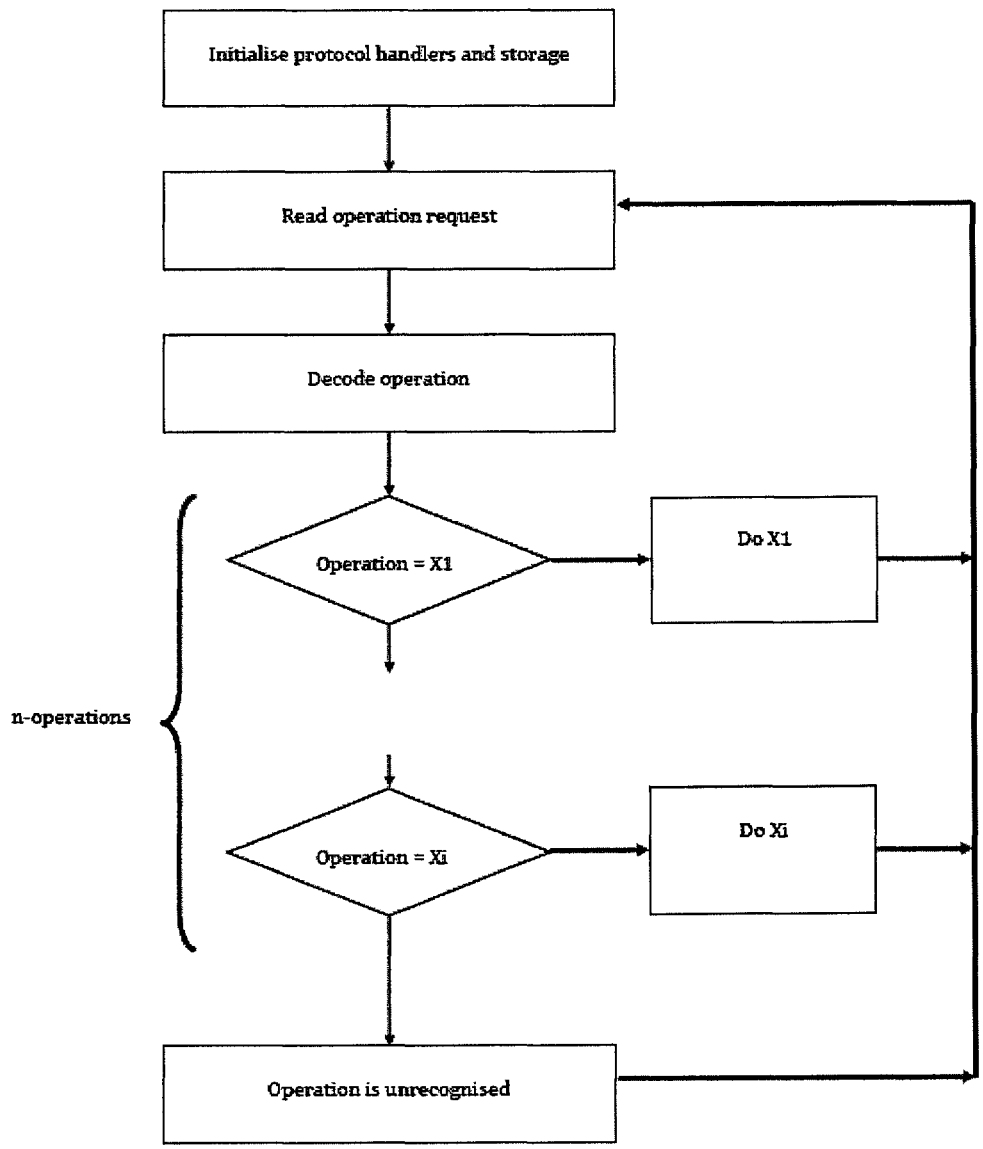
FIG. 4 is a flow-chart describing the processing logic of the apparatus of FIG. 1 and FIG. 2.

The diagram FIG. 4. is a flowchart of the main loop of a realisation of the comparator store as a password safe implemented on a AVR architecture.

The details of this realisation of the comparator store as a password safe and other uses are described in more detail below.

Different implementations of the interfaces, the Nanowall, the protocols and the operations that the Nanowall can carry out on the information in memory will first be described.

Operations and Interfaces Description

Throughout the rest of the description the word index shall be used for an index (plural indices) and data for information associated with that index by a storage operation.

In the exemplary realisation described below, the interface to the comparator store is a set of operations. Information supplied to the operations are referred to as parameters to the operation. Parameters to operations may be data, indices or other, i.e. information which is neither intended to be used as data nor used as an index. Such other parameters will be referred to as arguments to the operation. The comparator store implements operations that return information about indices, such as how many indices there are, the names of the indices, etc. but is constrained in terms of information it may return about data. In particular there is no operation provided such that the data stored under the indices may be directly retrieved.

The primary operations supported by the comparator store are:

1. Store data under new indices.
2. Compare arguments to data stored under indices.
3. Update data stored under indices by new data provided that certain arguments match data stored under certain indices.
4. Erase data and indices stored under indices provided that certain arguments match data stored under certain indices.

The operation of matching or comparing arguments to data stored under indices is application domain dependent and different application domains will require the use of different matching rules. Examples of such rules include, but are not limited to, equality matching in which information provided as arguments to an operation must match up to equality the data under specified indices; statistical matching in which arguments must match data stored under specified indices up to an acceptable error bound; transformation matching under which the argument data and/or the data stored under specified indices is transformed by some procedure before performing exact or statistical matching; validation matching in which an index indicates that its associated data should be used to validate the argument e.g. such as happens in checking a digital signature of the argument.

In some embodiments, the results returned by such operations are required to be independent of data stored under indices not mentioned in the operation, other than a specified set of default indices, and to be independent of the particular data in the sense given in the following example:

Suppose that we have an operation invocation "eq A K" that tests if the argument value A is equal to the data stored under index K. The result of eq A K is given by:

The index K indexes the data value A and the result is X
The index K indexes a data value other than A and the result is Y Then the operation "eq" is independent of the exact data stored if when the secret data stored is changed (e.g. replacing value A with value B), making a compatible change to the call (e.g. substituting data A by data B resulting in the call "eq B K") delivers the same result as the previous call of "eq A K" under the previous index association.

Moreover, to ensure secure data storage the results returned by such operations may also be required to be independent in the sense that the data under all indices are treated in the same way. In other words, there is no special treatment for any indices, other than for a specified set of default indices.

Storage, Comparator and Update operations are all independent in the sense given in this example. This means that information about secret data cannot be revealed by calling operations and analysing the responses to the operations.

One realisation of the present invention implements operations intended for particular application domains or to simplify management. In such a realisation it is possible to implement operations for:

5. Deriving challenge bounds.

Such operations may not be independent in the above sense. An example of one such non-independent operation is if the comparator store is used as the basis for a naïve challenge/response system in which a user is required to provide the characters at randomly chosen positions in the password to validate their possession of the password. Here at least the length of a piece of data stored under the index may be required. It should be noted that not all challenge/response system require operations to determine challenge bounds. An example of a challenge/response system is that of challenging the user with a random string, which the user hashes with the password to form a response. The comparator store can realise this form of challenge response with a transformational comparator operation.

In a further realisation of the present invention, operations may also be implemented for:

6. Signing of information supplied as arguments to an operation using data indexed by indices.
7. Encryption of information supplied as arguments to an operation using data indexed by indices.

Finally a realisation of the present invention may also implement management operations such as:

8. Self Test
9. Initiating Backup

Self-test operations are required to be independent in the sense above. That is, the result of a self-test operation is independent of the actual contents of the data, other than to data placed there by self-test operations. Self-test operations do not reveal information about the data store. An example of a self-test operation is a 'transmission test', in which an operation is called with a standard sequence of parameters and the comparator store returns a standard sequence in response, or an error code if the standard sequence is not recognised. Such a test allows the detection of problems in the handling of the comparator store call protocol.

Since a primary goal of the present invention is not to reveal data, particular attention must be paid to the notion of backup. In the following the words private network and private storage network are used to mean networks and storage network which are used only by the comparator stores; and the words public network and public storage network are used to mean networks.

There are three configurations of the comparator store with respect to backup:

1. Backup is performed entirely within the comparator store to a physically detachable backup device such as a USB memory stick. The comparator may encrypt its contents before backup.
2. Backup is performed entirely on the comparator store in that the comparator store implements a redundant memory model with majority logic to resolve conflicts. Algorithms for implementing said majority logic are various and well known by persons of ordinary skill in the art.
3. Backup is performed between comparator stores where the comparator stores are connected by a private network and either:
    a. Implement a redundant memory model between the separate comparator stores;
    b. Each store backs itself up to one or more other stores and uses majority logic to resolve conflicts when re-establishing its state.
    c. Stores are segregated into 'live' stores and 'reserve' stores and each live store backs itself up to one or more reserve stores. On, failure of a live store one of its reserve store backups is nominated as the replacement live store.
4. Backup is performed between comparator stores as in 3 but with the stores communicating with one another over a public network in which case the stores encrypt their contents before backing up to other stores.
5. Backup is performed to a private storage network that connects only to the stores.
6. Backup is performed to a public storage network over a public network in which case the stores encrypt their contents before backup.

In creating backups the comparator store may add a security signature based on a preconfigured signing key held on the comparator store. In such cases the comparator store will check the signature of the backup when reverting to that backup.

In each case where the comparator store encrypts backups, or signs backups, the encryption and/or signing keys are either:

1. Loaded onto the comparator store by a separate physical link, examples of which include but are not limited to, a keypad interface, USB memory device, USB memory stick, secure digital (SD) card, or micro SD card. This enables the use of a common key by several comparator stores by the loading of the same key.
2. Generated by the comparator store as a secret key that is stored on the device and not revealed. In this case key sharing between comparator stores is not possible.

Different realisations may implement any or all of the above additional functionality, or may implement additional functionality. No operation should deliver unencrypted output of the stored data.

Figure 5:
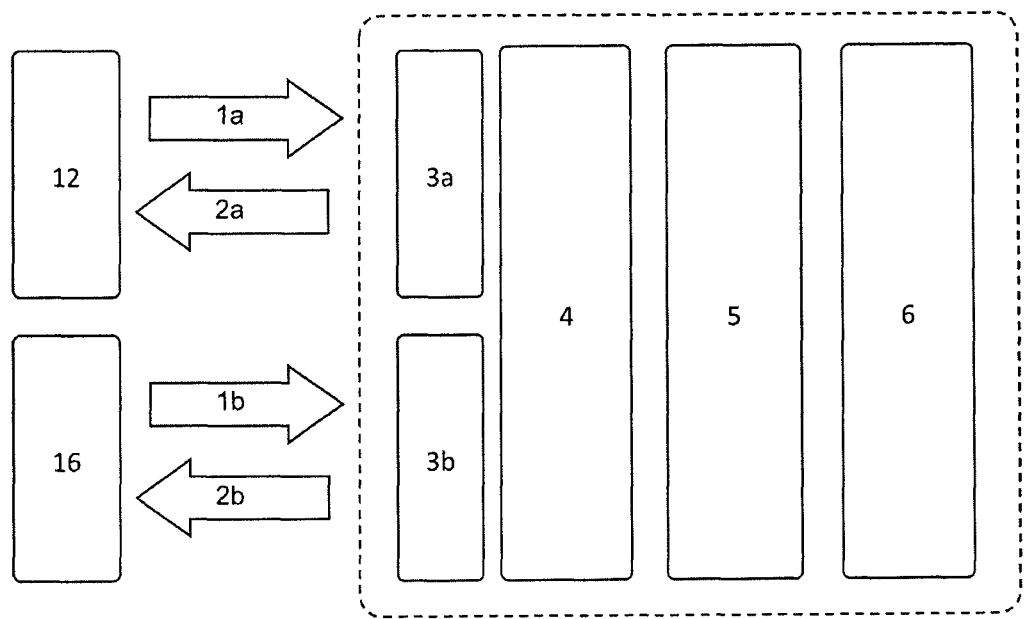
FIG. 5 is a schematic diagram of a system for processing and backing up secure data.

For example, as shown in FIG. 5, in some implementation to allow back-up, the comparator store 15 will have two front-end interfaces, a first interface 3a for communicating with the application server 12 and a second separate interface 3b for handling back-ups. While the comparator store 15 does not allow secret data to be returned to the application server 12, and the processor 4 is configured not to provide secret data over the first interface 3a, the processor can provide secret data over the second interface 3b to another entity 16 for back-up. As mentioned above, the other entity 16 can be another comparator store, a private network or a public network. The first interface receives messages 1a from and transmits messages 2a to the application server and the second interface receives messages 1b from and transmits messages 2b to the back-up device. The processor 4 performs operation on the memory 6 using the back-end interface 5 and communicates with the application server 12 and the back-up device 16 via to the first and the second front-end interfaces 3a, 3b. As an example, in the embodiments mentioned above wherein the comparator store 15 is connected to the application server 12 via an Ethernet cable or a USB connection, the first interface 3a in FIG. 5 may be an Ethernet card or a USB port card and the second interface 3b may be a physical interface separate from the Ethernet or USB port card of the first interface, such as another Ethernet card or a USB port card. The data provided via the second interface may be encrypted. In FIG. 5, the memory 6 is shown as part of the comparator store 15 but, as has been described with respect to FIG. 2, the memory may alternatively be a private network separate from the comparator store.

In some implementations, the data provided for back-up will never be extracted out of the data store 6. Instead, the back-up process is implemented by the secret data being stored in a redundant "back-up" memory at the time when it is first recorded in the comparator store. For example, if the processor 4 carries out an operation to update the data stored under a specific index, it may also forward the new data to a back-up device 16 at the same time. If the connection fails and the data cannot be forwarded, the processor stores the data in local memory and forwards it when the connection is available again. Consequently, in those embodiments, the secret data is never extracted from the secure data store for the purposes of providing it to another entity.

Nanowall Description

In FIG. 4 a flow chart is shown describing the processing logic of the Nanowall in one embodiment of the invention. The logic is essentially an infinite program loop which reads and decodes any pending commands received over the Front-End Protocol, and calls an appropriate function-handler to process parameter data.

The processing logic of the function-handlers, according to one embodiment, is described in LISTING.1 towards the end of the document. It is a source code listing of the processing logic of the Nanowall implemented as a password safe realised using the AVR architecture. The code given there does not implement the self-test, erase, backup and revert operations, however these operations would be easily implement by a person of ordinary skill in the art. The source code is provided to illustrate one implementation of the processing logic and other implementations are contemplated.

A key design principle of the comparator store is that the Nanowall is not programmable at 'run time'. That is, whatever implementation technologies are realised in the construction of the Nanowall, it should not be possible to inject code into the Nanowall while it is in use. This may be achieved in a number of different ways, including, but not limited to, implementing the Nanowall as fixed hardware realised, for example, using Field Programmable Gate Arrays (FPGA), or by implementing the Nanowall using a processor following the Harvard Architecture, in which program memory and data memory are separated, and ensuring there is no path from the operation call interface of the Nanowall to the program memory (expressed differently, programs can only be executed from the program memory and programs are read only after the device has been installed). These and other methods of defeating code injection are numerous and well known.

The processor may also be programmed to only accept messages up to a predetermined length, thereby preventing executable programs to be injected. For example, the processor may reject or truncate input messages that are larger than a predetermined length.

Particular example realisations of the comparator store in FIG. 1 and FIG. 2 include, but are not limited to, realisation via a microcontroller architecture such as AVR, peripheral interface controller (PIC) or MSP430; realisation in FPGA; realisation as application specific integrated circuit (ASIC); realisation as a custom integrated circuit (IC); realisation as micro-code in a central processing unit (CPU). In each of these realisations different memory roles are allocated to physically distinct memory. Thus, for example, data storage memory, dynamic state memory used for computation and program memory are kept distinct and program instructions are only executable if obtained from program memory. Moreover, where soft programming is used in the device the device is hardware switchable to and from program mode so that in normal operation as a comparator store, programs cannot be loaded, or modified. These and other precautionary measures in relation to memory segregation are well known.

The invention may therefore be implemented in hardware, software or a combination of both software and hardware. The invention may be provided as computer program comprising instructions on a memory that when executed on appropriate hardware, for example a Harvard Architecture machine, provides a comparator store as described.

Protocol Handling Description

The Front-End Protocol 3 and Back-End Protocol 5 may vary between realisations of the comparator store and are dependent on the technologies chosen for the realisation of the Nanowall and the Storage Device. There is no requirement for the Front-End Protocol and the Back-End Protocol to be the same. Typical examples of both the Front-End Protocol and Back-End Protocol include, but are not limited to, SPI, recommended standard 232 (RS-232), RS-485, controller area network bus (CAN-Bus), USB, USB2, USB3, Firewire and Ethernet. Implementation of hardware components and Software drivers associated with these transport protocols is well known by a person of ordinary skill in the art.

Particular care must be taken to ensure that the transport protocol chosen maintains protocol integrity such that requests and replies to the comparator store sent by an application server and replies from the comparator store back to the application server are not lost, or addressed incorrectly, such that operations requests and replies are routed to the wrong application server or arrive in the wrong order.

Non-Sequential Protocols: If operations requests are made over a transport protocol that fails to maintain order of requests and replies (i.e. if the request rq1 and rq2 are made and they may arrive in either order and the replies rp1 and rp2 are made in response and they may arrive in either order) then either:

1. An order maintaining front-end protocol is constructed over the transport protocol by wrapping requests and replies in an additional layer of protocol handling; or
2. An additional parameter is added to the operation request to identify the particular operation request and the reply to the operation also carries this request identifier, allowing the application server to pair up requests and replies.

3. A hash of the operation request is returned as part of the reply that permits the application server to establish the correspondence between the request and the reply. The application server may additionally include a request identifier, timestamp or nonce in its operation request to make the corresponding request unique.

Protocols for Multiple Application Servers: If a single comparator store is used by multiple application servers over a front-end protocol that maintains addressing information for the application servers then a front-end request handler sits in front of the comparator store and handles the routing of replies back to the correct application server.

Protocols for mitigation of Man-in-the-Middle: If there is the possibility of the front-end protocol being subject to man-in-the-middle attacks then the operation request, and/or the operation reply, may be protected by digital signing. Digital signing of replies takes place within the comparator store before the replies are sent over the front-end protocol. If asymmetric keys are used for signing this offers particularly strong protection for the reply because the signing key is held on the comparator store. In the case of protection by digital signing the application server may additionally add a nonce to the request and the signature may also contain a secure hash of the operation request (including the nonce), which ties together the request and reply. This enables the application server to verify that the reply matches the operation request that it made.

Existing methods of constructing protocol handlers that take the above aspects into consideration are numerous and well known.

Data Store Description

As mentioned above, the data store 6 can be provided as a local memory within the same housing as the Nanowall or as a separate private network. In some embodiments the data store may be implemented in solid state memories such as flash memory or dynamic random access memory (DRAM) memory and in other embodiments the data store may be implemented in a mechanical hard disk drive (HDD).

Figure 6:
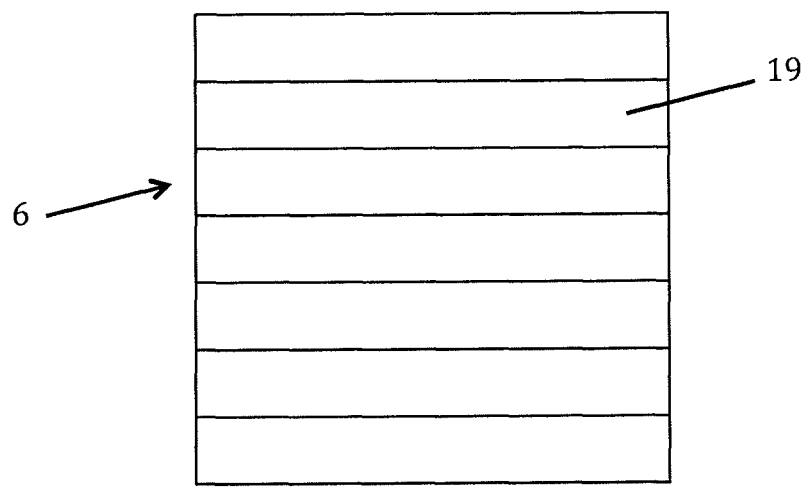
FIG. 6 is a schematic diagram of a memory for storing credentials, according to an embodiment of the invention.

For example, in some embodiments, the data store 6 may be implemented in flash memory organised as a hash table. Hash tables are data structures that are well known to those skilled in the art, in which user identities are used as an indexing value against which user credentials, meta data and possibly other rarely changing data is stored. With reference to FIG. 6, the flash memory 6 may be organised as a single uniform space of blocks 19, each of which is sufficient in size to accommodate a user identity, the credentials associated with that user identity, the meta data associated with that user identity and possible additional rarely changing data associated with that user identity.

The user identity, the credentials, the meta data and the other rarely changing data may all be considered secret data to which access is restricted using the comparator store.

Hash collision is treated by creating entries in the same uniform space of blocks as normal hash entries.

The hashing algorithm is performed by two functions, f and g. Function f take as argument a user identity and returns the address of a block within the flash memory; function g takes as arguments a user identity and a block address and returns a block address. Indexing into the hash table is performed by:

1. Applying f to a user identity, u, and obtaining a block address, b.
2. If the block, b, is not in use then this block is used to record the user identity and the associated credentials, meta data and other rarely changing data.
3. If the block, b, is in use then a new block is located using the function g with arguments u and b to obtain a new block b.
4. If the new block b is in use then step 3 is repeated with g taking arguments u and the new block b to produce a new block b. This process is repeated until either a predefined limit is reached or a free block is found.
5. If a free block is found then the block is used to record the user identity and the associated credentials, meta data and other rarely changing data.
6. If no free block is found a memory full signal is generated.

The use of the same uniform block space removes the necessity of the use of separate overflow areas, secondary tables etc.

The use of a single uniform address space reduces the need for write 'hot spots', that is, areas of the flash memory that are written to more frequently than other areas to maintain indices, directory structure or other meta data associated with a file system. Flash memory has a finite life for write but an unbounded life for reads. By preventing 'hot-spots' the flash memory is extended since the time it takes for any area of the flash memory to reach the end of the finite read life will be longer.

The use of a single uniform address space also has data consistency advantages. The use of the same block to accommodate a user identity, the credentials associated with that user identity, the meta data associated with that user identity and possible additional rarely changing data associated with that user identity means that separate tables are not required to be updated and different write operations to update different parts of the memory are not necessary when the data associated with a user identity needs to be updated. This also reduces the risk of inconsistency errors in case of a power failure during the update. If different parts of memory need to be updated to complete an operation, it may not be known if all parts of the memory were updated before the power failure and various steps would then need to be taken to ensure the memory is consistent and up to date. Conversely, if only one block space of the memory needs to be updated to complete the operation the risk of error is reduced.

Moreover, by using a single block write, read and write performance is improved. Since no meta data tables need to be updated, read and write times are reduced.

User credentials have a particular characteristic with respect to how they are used over time. User identities, once created, are only read or deleted, credentials, such as passwords, PINs and credit card numbers, associated with any given user change infrequently and master biometric data is very rarely, if ever, updated. This characteristic can be described as 'write rarely' data. A flash memory with the data structure described above exhibits a complementary asymmetry to write rarely data, since flash memory has a finite life for write but an unbounded life for reads, and provides a particularly efficient way of storing passwords and/or similar "write rarely' data.

Although the flash memory described above has been described as a data store of a comparator store, it should be realised that a data store implemented in flash memory can be used in any type of application where storage of 'rarely write' data is required.

Password Safe Example

An exemplary realisation of the present invention is a password safe shown in FIG. 3. In the scenario shown, a user wishes to gain access to a website, perhaps to shop over the internet, but must first identify themselves by logging in to the site before being allowed access to web pages that comprise the on-line store. The present invention is realised as a password safe which replaces a conventional password file store mechanism that is used by a web server to store passwords and authenticate users.

With reference to FIG. 3, a user, with a user device 7, connects to a webserver 12 via the internet using web browser software and is presented with a login page in which they are invited to enter a user_id and a password, then press the SUBMIT button. On entering the required data and pressing SUBMIT, the user_id and password is sent to the web server 12 for authentication. To authenticate the user, the web server 12 generates a 'check' command which it sends to the password safe 15 over the Front-End Protocol, supported by the front-end interface 3 of the comparator store, which includes the supplied user_id and password as parameters, then waits for a reply. The password safe 15 on receiving the 'check' command, searches it's Data Store 6 for a record that matches the supplied user_id and password and returns a byte of data to the web server 12 over the Front-End Protocol indicating either a YES (match) or a NO (failed to match). If the data reply indicates a match, the web server 12 grants the user 7 access to the on-line store by returning web pages stored in 14. If the data reply indicates a failure to match, then the web server displays the login page again inviting the user to re-enter their user_id and password, and denying the user access to the on-line store.

In this realisation of the comparator store, with reference to the hardware of FIG. 1, the Nanowall 4 is realised in the AVR microcontroller architecture and the Store Device 6 is realised as an SD card that is used to provide a distinct bulk data storage memory for passwords. The Front-End Protocol is realised using USB and is the interface by which the Webserver sends command operations to, and receives results from, the comparator store. Data transfers between the Nanowall 4 and the Store Device 6 are via the Back-End Protocol supported by the back-end interface 5 realised using a Serial Peripheral Interface (SPI).

The AVR microcontroller realisation of the Nanowall 4 has three types of memory erasable programmable read only memory (EPROM), FLASH and random access memory (RAM). Large constants such as tables, strings or images reside in EPROM, program is in FLASH and dynamic state in RAM. The architecture does not permit the program to execute from RAM and, in general, there is no route to installing programs in FLASH once the AVR is programmed (unless a bootloader has been already placed in FLASH and is enabled).

The program in FLASH consists of an initialisation step initialising the communication channels to the application (USB) and the SD card storage device (SPI), and an infinite loop responding to requests from the web server.

Requests sent from the web server to the comparator store are of the form:

Command parameter-list <newline>

Requests are sent as a string over the USB interface, and responses are strings sent back to the web server over the USB interface.

The password safe uses strings representing user identities as indices and stores strings representing the users' passwords as data. An index, i.e. a user_id, and its associated password are referred to as an account which is represented as a pair of strings (user_id, password). The abstract description of the Command operations supported by the password safe are:

Create a new account:
Create(user_id, password)
This operation is successful if there is no existing account on the device with index=user_id, in which case it creates the account (user_id, password). Otherwise it fails.

Update an existing account by giving it a new password:
Update(user_id, old_password, new_password)
This operation is successful if the account (user_id, old_password) is stored on the device and is available to the Update operation, in which case it replaces the account (user_id, old_password) with (user_id, with_password), and is made available to both the Update operation and the Check operation. Otherwise it fails and does not change the stored user_id/password pairs.

Erase the account with index=user_id matches a given password guess:
Erase(user_id, password_guess)
This operation is successful if the account (user_id, password_guess) is stored on the device. Otherwise it fails.

Check if the password for the account with index=user_id matches a given password guess:
Check(user_id, password_guess)
This operation is successful if the account (user_id, password_guess) is stored on the device and is available to the Check operation. Otherwise it fails. This operation is another form of the compare operation listed as number 2 in the list of primary operations in the Operations and Interfaces section of the description.

Partly Disable an account, making it unavailable for the Check operation but available for the Update operation:
Partly_Disable(user_id)
This operation is successful if the account with index=user_id is stored on the device, in which case it places the account in a state where it cannot be used by the Check operation. Otherwise it fails.

Fully Disable an account making it unavailable for both the Check operation and Update operation:
Fully_Disable(user_id)
This operation is successful if the account with index=user_id is stored on the device, in which case it places the account in a state where it cannot be used by the Check operation or the Update operation. Otherwise it fails.

Enable a fully disabled account, supplying it with a new password and making it available for Update, or reverting it to its enabled state with the same password.
Enable(user_id, admin_password, optional new_password)
This operation succeeds if the account ("admin", admin_password) exists on the device and either (a) the optional argument new_password is given, in which case, the account with index=user_id is placed in a state where it is available to the Update operation (but not to the Check operation) and the account password is changed to new_password; or (b) the optional argument is not given, in which case, the account is made available to both the Update operation and the Check operation.

Backup the comparator store:
Backup(stamp)
Backup causes the comparator store to backup to another, preconfigured, storage device, giving the backup the identity stamp. In practice the stamp is likely to be a combination of the comparator store name (or number) and a time stamp indicating when the backup was made.

Revert the comparator store to a previously backed up state:
Revert(stamp)
The comparator store is reverted to the previous state recorded as backup stamp stored on the preconfigured storage device.

In this example, password data never traverses the Front-End protocol after being stored.

LISTING.1 towards the end of the document, is a source code listing of the processing logic of the Nanowall implemented as a password safe realised using the AVR architecture. The source code given there does not implement the self-test, erase, backup and revert operations, however these operations would be easily implement by a person of ordinary skill in the art. As mentioned above, the listing is only provided for illustrative purposes and other implementations are contemplated.

The concrete realisation of the operations is as strings transmitted over the USB interface from the web server to the password store of the form:
!!!<character><argument-list><carriage return><newline>
with the correspondence to command given by:

| | |
|---|---|
| Create(user_id, password) | !!!w user_id password <cr><lf> |
| Update(user_id, old_password, new_password) | !!!u user_id old_password new_password <cr><lf> |
| Check(user_id, password_guess) | !!!c user_id password_guess <cr><lf> |
| Partly Disable(user_id) | !!!d reset user_id <cr><lf> |
| Fully Disable(user_id) | !!!d admin user_id <cr><lf> |
| Enable(user_id, admin_password, optional new_password) | !!!e user_id admin_password optional new_password <cr><lf> |
| Backup | Not implemented |
| Revert | Not implemented |
| Erase | Not Implemented |

This code therein can be adapted for realisations on other microcontroller based architectures.

Although an example of a password store has been described above to use a processor 4 implemented using an AVR microcontroller architecture, a store device 6 realised in a SD card, a front end interface 3 using a USB interface and a back-end interface 5 realised using a Serial Peripheral Interface (SPI), it will be realised that the processor, store device and interfaces can be realised in other ways. For example, the store device may be implemented in flash memory as described above.

Integrity Validation Example

A further exemplary realisation of the present invention is an integrity validator in which information provided by a user is validated by checking its digital signature. This is essentially the same as the password safe example above except that passwords are now replaced by symmetric signature keys and the check operation definition above is replaced by:
Check if the information, inf, provided by the user with specified user-id has been signed correctly for that user:
Check(user_id, inf)

This operation is successful if inf has been signed using the digital signing key stored as data under the index=user_id. Otherwise it fails. As above, this is another form of the compare primary operation in that the information inf, and specifically the signing key used to sign the data to provide the information inf, is compared to and validated against the data stored under the index.

The conventional approach to this problem is to use asymmetric keys so that the signing key is distinct from the validation key. This allows the validation key to be public without the risk of the validation key being used to fake a signature of the signer. This is particularly useful when the validation key must be shared or made public. However not all applications require the validation key to be shared. For example data, collected by a single organisation, from remote sensors, may be signed to validate it was indeed generated by a given sensor. In this case a symmetric signing algorithm can be used in which each sensor identity is associated with a signing key. The comparator store provides a safe store for such a symmetric key in that once registered with the store the symmetric key cannot be retrieved from the store and thus, in this situation, provides much the same security as would the use of an asymmetric key solution.

Secure Voting Machine Example

A further exemplary realisation of the present invention is provided in the application of an electronic voting machine. In this realisation, each voting machine is implemented as a comparator store which registers votes from individual voters in a referendum. For example, each voter may register their vote for a candidate or express an opinion in a ballot question, and the vote is stored in the comparator store indexed by their voting_id. The voter may also provide a password known only to them, which enables the voter to subsequently interrogate the machine to validate the machine's recording of their vote, or even change their particular vote before the pole closes. The voting machine may also contain its own signature key for the purposes of creating a signed summary of the vote to be passed onto to a vote aggregator (which is also a comparator store) to sum the votes from all the voting machines. The vote aggregator validates the output of each voting machine and produces an overall summary of the vote. In this example the comparator store architecture is used both to protect the secrecy of the voter's votes and to protect the integrity of the referendum through the aggregation process.

In this example, with reference to FIG. 5, the comparator store 15 would be connected, via the first interface 3a, to an application server 12 and the user would store and update the vote in the secure memory 6 via the application server, the first interface 3a and the processor 4. The vote aggregator may take the place of the back-up device 16 and may connect to the comparator store using the second interface 3b. Alternatively, the vote aggregator may be a third entity to which the comparator store can connect and may connect via a third interface, similar to the second interface 3b, in that it may provide secure data to a trusted device in encrypted form and is inaccessible to the application server. In this example, the comparator store may comprise one interface for the application server, a separate interface for the vote aggregator and another separate interface for back-up.

Secure Lottery Ticket Store Example

A further exemplary realisation of the present invention is provided in the application of a secure lottery ticket store. In this realisation, the lottery company wishes to validate tickets against purchasers in such a way that only the purchaser of a winning ticket can claim a prize. In this process, the purchaser is issued with a ticket and the purchaser provides some identity information which is stored as data under the index ticket in the comparator store. The comparator store comparison operation compares proffered identity information against that stored under the ticket index. If a ticket wins, the purchaser need only produce the identity information that they registered at the time of purchase as proof of ticket ownership. Throughout, the identity information used by the purchaser is kept private and cannot be retrieved.

The identity information may be input into a user device of the ticket purchaser or a user device of the cashier when the ticket is bought in a shop. With reference to FIG. 5, the identity information is sent to an application server 12, which may be controlled by the lottery company, and the application server provides the identity information via the first interface 3a to the processor 4 of the comparator store 15. The processor 4 of the comparator store then carries out an operation to store the identity information in the memory 6 under an index associated with the lottery ticket. If the ticket wins, the identity information is again input using the user device and communicated to the processor 4 via the application server 12 and the first interface 3a and the processor 4 carries out a compare operation to check that the identity information received is the information that is stored under the index associated with the lottery ticket.

Credit Card Store Example

A further example realisation of the present invention is provided in the application of a credit card store. An application server may provide an internet shop front and shopping card functionality and may use a comparator store as described to store sensitive information. The sensitive information may be stored against the index of user names and may comprise user passwords for the users' shopping accounts and the users' credit card information. Unlike the password storage example, in this example there are two types of sensitive information: The users' passwords which are never disclosed from the comparator store and the credit card details which may be disclosed, typically in encrypted form, to the credit card company for the purposes of carrying out a credit card transactions, but which are never disclosed to the application server.

With reference to FIG. 5, the application server 12 will forward password and credit card information to the comparator store 15 when the user first registers for internet shopping. Once registered on the comparator store sensitive information is unobtainable to the application server. When the user then wants to purchase a product using the application server 12, the user may only need to indicate his or hers user id and the password, and based on this information, the processor 4 of the comparator store can check the secret data in the data store 6 and provide a response to the application server 12 that will allow the application server to authenticate the user and decide whether the purchase should proceed. The credit card company needs the information to complete the credit card transaction but the application server only needs to know that a transaction for the right value has been performed. Consequently, while the comparator stores uses the first interface 3a to communicate with an application server 12, the comparator store may use the second interface 3b, or an interface similar to the second interface 3b in that it allows the processor to send secure data that is inaccessible to the application server, to communicate with the bank and may provide the credit card information to the bank via the second interface. Consequently, the credit card information is only transmitted over an interface that is inaccessible to the application server. In this example, the comparator store may have three front-end interfaces, including one for the application server, one for the bank and one for back-up.

Protecting Credentials "In Use"

As well as stealing credentials from backing storage an increasingly common form of attack is to steal credentials from the active memory of an authenticating server by planting software on the authenticating server that sweeps the active memory in search of data configurations, such as fields of HTTP responses, that contain passwords, credit card numbers, or other credentials.

It will now be described, in detail, an additional mechanism that when used in conjunction with a comparator store protects "credentials in use" as well as "credentials at rest".

The extension consists of a new hardware element that we refer to as a pre-server. The pre-server filters connections over protocols, such as, but not limited to, hypertext transfer protocol (HTTP) or socket secure (SOCKS) and rewrites the contents of credentials fields found in the input. In the case of HTTPS secure (HTTPS) or other secure sockets layer (SSL) wrapped protocols the SSL connection is terminated at the pre-server.

Figure 7A:
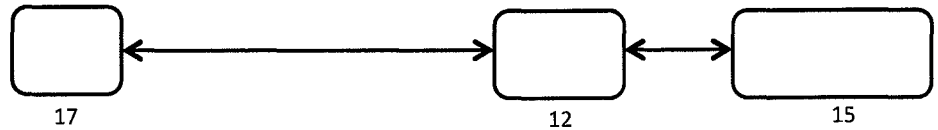
FIG. 7a and FIG. 7b are schematic diagrams showing a system that protects "credentials at rest" and a system, comprising a pre-server, that also protects "credentials in use"

FIG. 7a is a schematic diagram of a system for protecting "credentials at rest" comprising a client 17, an application server 12 and a comparator store 15 as described above. FIG. 7a illustrates the flow of information between the client, the application server and comparator store when the comparator store is being used to protect "credentials at rest" as described above. The client may be a user device. In this case credentials are issued by the client machine 17 and travel to the server 12. Authentication functions, such as verifying a user's password and setting a user's password are performed by the server 12 sending the credentials as part of a verification command to the comparator store 15 and the comparator store 15, replying to the server 12, with a reply that indicates success or failure.

Figure 7B:
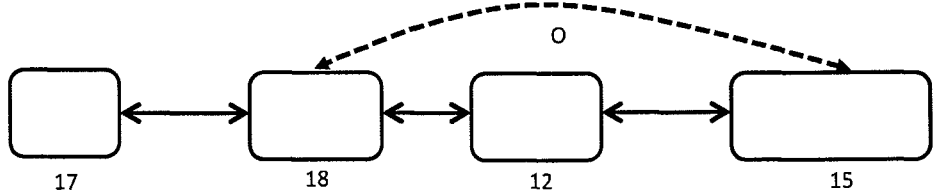

FIG. 7b illustrates the flow on information when the additional pre-server component is deployed to protect "credentials in use" in addition to "credentials at rest". In this case, the system comprises in addition to the application server and a comparator store, a pre-server 18 which receives information from the client or user device 17. In this case the client 17 communicates with the pre-server 18 that rewrites all instances of credential fields in the communication from the client 17 according to one of the schemes described below. The pre-server 18 then passes the rewritten communication from the client to the server 12 and the server 12 performs authentication functions as in the previous case except that it forwards the credentials as rewritten by the pre-server 18 to the comparator store 15. The comparator store may comprise a secure memory for storing credentials or may use a separate secure memory for storing the credentials, as has been described with FIG. 1. and FIG. 2. The dashed line, O, between the pre-server 18 and the comparator store 15 represents the possible use of an out-of-channel communication path between the pre-server 18 and the comparator store 15. This is discussed below.

In general the techniques present here may be applied to a wide range of types of credentials. Typical examples of credentials include, but are not limited to passwords, pins, biometric data such as fingerprint and iris scans, and include more 'semantic' forms of credentials such as the ability to answer some collection of questions drawn from a set of questions to a specified level of accuracy. The primary difference between forms of credentials treated is between those that require exact matching for successful authentication and those that require only approximate matching. This distinction occasionally requires additional constraints on the rewriting operation as raised below.

Additionally the use of a pre-server and the rewriting techniques described here may also be used in conjunction with other credentials authentication servers replacing the comparator store to provide protection of credentials in use. Instead of the authentication server using a separate comparator store, the authentication server may have its own secure memory for storing the credentials.

Credentials may be rewritten to a number of different forms, or modes, depending on the particular configuration of the comparator store that the pre-server is paired with:

A The credentials are rewritten to an encrypted version of the credentials under a symmetric key shared between the pre-server and the comparator store.

B The credentials are rewritten to an encrypted version of the credentials under a symmetric key that is the public key of the comparator store.
C The credentials is rewritten to a temporary tag and the tag-credentials pairing is communicated out-of-channel, by route O in FIG. 7b, between the pre-server 18 and the comparator store 15.
D The credentials are rewritten to a (possibly keyed) hash value using a key shared between the pre-server and the comparator store. If this mode is used with credential forms that require approximate matching then strong technical conditions are imposed on the hash function, specifically, if credential form X approximately matches credential form Y, then there must be a suitable notion of approximation of hashed values (denoted h(X) and h(Y)), such that under this notion h(X) approximates h(Y).

When a user or system connects to the pre-server to set or verify credentials, the pre-server, using one of the above modes, rewrites all credentials embedded in the request.

The verification or credential change step then proceeds in the normal way using the comparator store (or other authentication service) except that the rewritten credentials are used instead of the original credentials.

Figure 8:
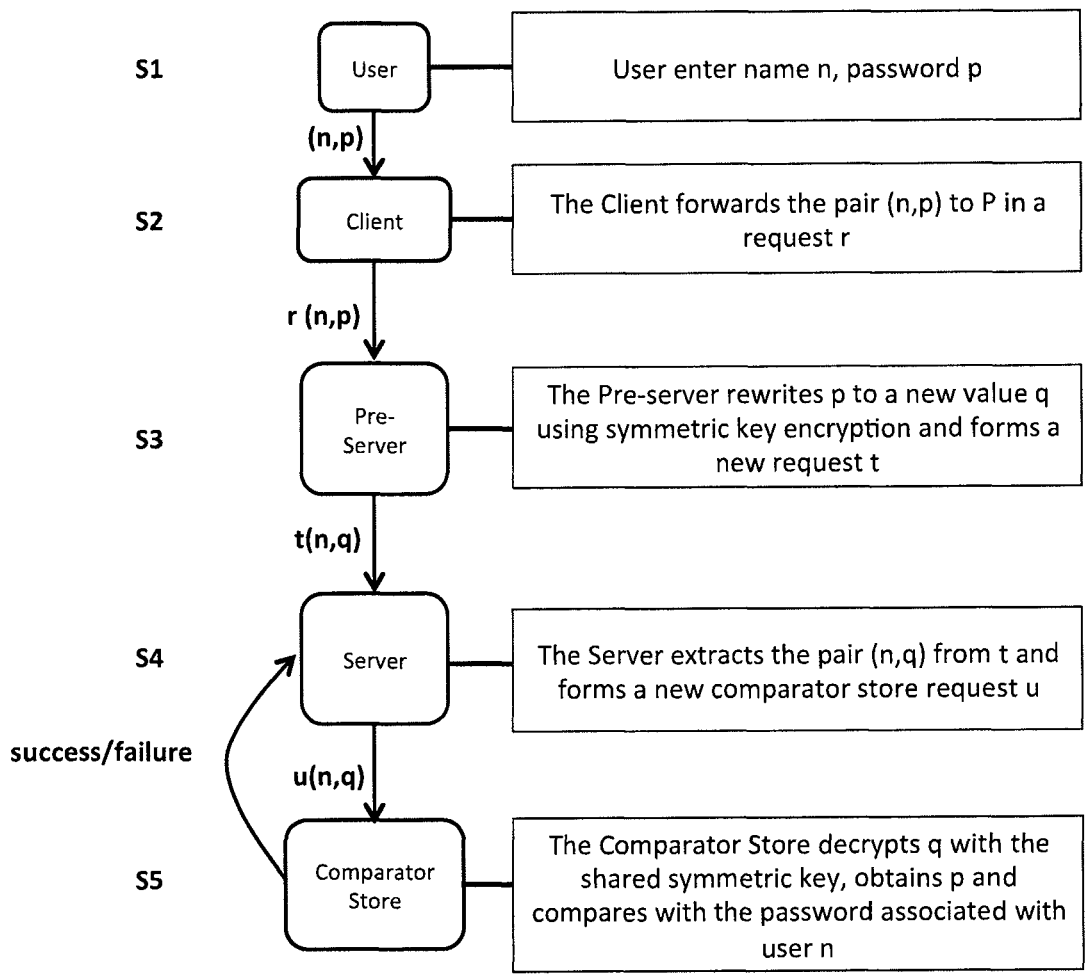
FIG. 8 is a flow-chart illustrating a method of processing secret data using the system of FIG. 7b.

FIG. 8 is a flow-chart illustrating an example of a process for checking credentials using the system of FIG. 7b. If we consider the case in which a server, 12 is using a comparator store 15 for password based authentication; for illustrative purposes that the pre-server is using mode A above for rewriting passwords (i.e. symmetric key encryption); and there is a user, with user name, n, at client 17 who is using a password, p, to authenticate to a server 12; then the sequence of events is as follows:

At step S1, the user supplies their user name, n, and password, p, to the client 17.

At step S2, the client 17 forwards the pair (n,p) to the pre-server 18 embedded in a request, r, sent over whatever protocol is being used for clients-server communication.

At step S3, the pre-server 18 rewrites the password field contents, p, to a new value, q, and forms a new request, t, that differs only in that the original password, p, has been replaced by the rewritten password, q, and forwards the new request, t, to the server 12.

At step S4, the server 12 extracts the pair (n,q), from the rewritten request t, and forms a new comparator store request, u, to the comparator store being used for password verification. The Server 12 then makes the request, u, to the comparator store 15.

At step S5, the comparator store 15 evaluates the request u from the server 12. In evaluating the request the comparator store 15 uses the shared symmetric key to decrypt the rewritten password q, to obtain the original password, p. The comparator store then performs the required comparison of passwords using p. That is, the comparator store looks up the password associated with user name n, and compares the result of this look up with p. The comparator store then communicates success or failure of the comparison to the server 12.

A similar sequence applies if a user resets their password. However, in this case, the user resetting passwords, although in this case the user will supply both the current password, p, and the new password, x. In this case the rewriting process at the pre-server must write both p and x.

Similar sequences of events follow for modes A, B and C above.

In the case of mode C rather than decryption being applied to the rewritten password at the comparator store the password is obtained from the corresponding tag association.

Considering mode C in more detail, the pre-server 17 may create a unique tag and may send the unique tag to the application server 12 in place of the credentials and also communicate the pair of the tag and credentials via the out of channel route O to the comparator store 15. The unique tag may include, but is not limited to, a random sequence of binary digits, characters and/or numbers or a non-random sequence of binary digits, characters and/or numbers derived from the current time and date, or derived from an internal counter, or derived from a record of previously used sequences. Consequently, the credentials are never seen by the server 12. The server 12 only ever sees the tag. The server uses the tag as if it were the credentials to the comparator store. The comparator store 15, having been given the pairing of tag and credentials out of channel, can pair the tag from the server 12 being used as credentials with the actual credentials and then use the actual credentials for the comparator store verification step.

Mode D differs in that the rewritten password is not decoded or replaced and is used directly for the comparator store operations.

Additionally to the rewriting described so far additional data may be added into the rewritten form as either plain text or encrypted text. Such additional data includes, but is not limited to, the use of random bit to 'salt' encryption or hashing, thus improving its resilience to attack; the inclusion of time and date information to ensure that tags are 'timely', or 'fresh' and defeat replay attacks or similar use of 'logical clocks' to establish that rewriting is 'timely' or 'fresh'.

So, for example, if we consider the previous example of password verification the rewritten password might have been rewritten to the form:
encrypt(k,[nonce,utc,p])
where:
  i. k is the symmetric encryption key.
  ii. nonce is a fixed length random bit string
  iii. utc—is the fixed length time and date in Coordinated Universal Time
  iv. p is the variable length password supplied by the client
  v. [nonce,utc,p] is the concatenation of the nonce, utc time and date and password p into a binary string.

On receipt of the rewritten password the comparator store decrypts the message, extracts the various fields from the decrypted form and compares the value of utc with a local time reference. If utc and the local time reference agree within an acceptable tolerance the comparator store compares the decrypted password with the locally looked up password and proceeds as in the previous case. If the utc time does not match the local time reference within the required tolerance, the comparator store replies with failure to the server.

In some embodiments, when keys are used between the pre-server and the comparator store they may be changed according to an arbitrary schedule, provided that they remain coordinated between the two entities. Coordination may take place by:
  1. Pre-arranged timing between the pre-server and comparator store.
  2. In channel signaling as additional information included in the rewritten password.
  3. Out-of-band signaling over the link O in FIG. 6b.
  4. External manual intervention at the pre-server and comparator store.

Coordination messages may include directive to change key and/or new keys to be used.

In addition to the measures already taken the stored data in the authentication server or comparator store may also be salted, encrypted, hashed or keyed hashed. In this case keys are local to the comparator store or authentication server. The comparison steps are then adjusted for these operations e.g. if credentials are stored in encrypted form either the stored credentials are decrypted before comparisons are performed or the credentials supplied by the client in the request are encrypted and the comparison is performed on the encrypted versions of the credentials. This latter mode is required if hash or keyed hash are used instead of (reversible) encryption.

The additional protection obtain by this measure is that if stored credentials are leaked from the comparator store/authentication server storage these passwords will not be useable at either the client 17 or the server 12 for authentication as they are 'in the wrong form'.

As described above, embodiments of the invention relate to data storage in computers and computer networks, in particular the secure storage of data including, but not limited to confidential data such as passwords, biometric data, credit card data, personal identifiers that uniquely identify an individual (such as in the United States of America their social security number), authorisation levels where an entity may make a claim to have a certain level of access or authorisation, votes cast in an election and encryption keys.

Whilst specific examples and embodiments of the invention have been described, the scope of the invention is defined by the appended claims and not limited to the examples and embodiments described. The invention could therefore be implemented in other ways and numerous modifications and alternative arrangements can be contemplated, as would be appreciated by those skilled in the art.

For example, although it has been described with respect to some of the figures that the application server uses the comparator store to decide whether to allow a user device access to a resource, the application server may use the comparator store for other purposes as is evident from some of the other examples described above. For example, the application server may use the comparator store to check that data received is in fact from a given source of data or to securely store data to be accessed by a third party.

Moreover, although examples of how the different components of the comparator store could be implemented have been described it shall be realised that the description of specific implementations are provided for illustrative purposes only and that other implementations are contemplated.

Listing.1
/*
================================================================================
====

The following code is written in the Sketch language for an Arduino UNO AVR microcontroller board with an SD-card interface provided by an Arduino Ethernet Shield. It illustrates an implementation of a USB based implementation of a comparator store used as a password safe for a single application server making operation calls over the USB interface using the call protocol !!!<command character><arg1> . . . <arg3><carriage-return><line-feed> where <arg1> to <arg3> are optional (i.e. there may be zero, one, two or three arguments depending on the command).

Although this code is for illustration purposes only attention is drawn to the buffer handling within the code. All buffers are of fixed length and length is checked when data is written into a buffer. Buffers are implemented as vectors and collections of buffers as vectors of vectors using static indexing rather than pointers to address buffers.

Procedures are used in a limited way and in particular non-recursively to limit the usage of the stack. Heap allocation is avoided excepted in-so-far as it is used in the SD library or by the compiler.

In the model of a password store below there is a special user called admin that cannot be used for general authorisation (i.e. the check command) but has special privileges with respect to password store management once the account has been given a password.

The invention claimed is:

1. Apparatus comprising:
  (i) an interface configured to receive messages from and transmit messages to an application server that uses the apparatus for protecting data associated with a plurality of users,
  (ii) a memory configured to store information associated with a plurality of independent users, wherein the memory is a non-transitory storage medium, wherein the memory comprises flash memory organized as a hash table for storing secure data, the flash memory being organized as a single uniform space of blocks, each of which accommodates a user profile, and
  (iii) a processor configured to perform a limited number of pre-determined operations on the information stored in the memory, the information comprising data, wherein the information is kept secure from unauthorized access,
  wherein the processor is configured so that it is not programmable at run-time;
  wherein the interface is configured to receive a message from the application server that comprises data associated with one of the plurality of independent users, the data having been received by the application server from another device,
  wherein the processor is configured to perform an operation on the information in the memory, comprising comparing data based on the received data against the secure data stored in the memory and to provide a response to the application server, via the interface, based on the comparison,
  wherein the limited number of pre-determined operations do not include providing the secure data stored in the memory to the application server, and wherein the secure data is not extractable from the memory via the interface.

2. Apparatus according to claim 1, wherein the information stored in the memory comprises indices and data associated with each index and wherein the processor is configured to perform the limited number of pre-determined operations on the information by using the indices.

3. Apparatus according to claim 1, wherein the information stored in the memory comprises user ids and authentication data associated with each user id for authenticating a user and wherein the application server is an authentication server arranged to authenticate a user based on responses from the apparatus.

4. Apparatus according to claim 1, wherein the information stored in the memory comprises user ids and one or more out of passwords, biometric data and pins associated with the user ids for one or more external resources and the application server is configured to permit or reject access to the one or more external resources based on responses from the apparatus.

5. Apparatus according to claim 1, wherein the processor is configured to only accept messages from the application server up to a predetermined length and to reject or truncate input messages that are larger than the predetermined length.

6. Apparatus according to claim 1, wherein the limited number of predetermined operations comprise an operation to update the secure data in the memory with data received from the application server.

7. Apparatus according to claim 1 wherein the processor is configured to provide results of the limited number of operations to the application server and wherein the results are limited to success, failure or information about an error condition.

8. Apparatus according to claim 1, wherein the interface provides a first interface and the apparatus further comprises a second interface for providing information to a back-up entity and wherein the processor is configured to provide secure data, in encrypted form, to the back up entity via the second interface.

9. Apparatus according to claim 1, wherein the memory is configured to store data and meta data associated with a user profile in the same block of the uniform space of blocks.

10. Apparatus according to claim 1, further comprising an application server configured to use the memory to store data associated with a plurality of users, the application server being configured to receive data from a plurality of devices associated with the plurality of independent users and to transmit data received from the plurality of devices, via the interface, to the processor for comparison against data stored in the memory.

11. Apparatus according to claim 10, further comprising a pre-server configured to provide an intermediary between the plurality of devices and the application server, the pre-server being configured to rewrite data received from the plurality of devices, to be compared against secure data stored in the memory, and forwarding the rewritten data, and not the actual data received from the plurality of devices, to the application server, the pre-server being configured to re-write the data by one out of
- encrypting the data,
- rewriting the data to a temporary tag and communicating the tag and data to the processor, via the interface, while only communicating the tag to the application server, and
- rewriting the data to a hash value using a key shared between the pre-server and the processor.

12. A computer implemented method, executable on a processor, the method comprising:
- receiving in an apparatus including the processor a message from an application server that uses the apparatus for protecting data associated with a plurality of independent users from unauthorized access, the message comprising data received by the application server from another device, the message comprising data associated with one of the plurality of independent users;
- carrying out in the processor an operation on the information stored in the memory, in response to the message, the information comprising data associated with the plurality of independent users, wherein the information is kept secure from unauthorized access, the operation comprising comparing data based on the received data against the secure data stored in the memory; and
- providing a response to the application server based on the comparison, wherein the operation is one out of limited number of pre-determined operations that the processor of the apparatus can carry out on information in the memory,
- the processor not providing the secure data stored in the memory to the application server,
- the processor configured not to respond to a request to extract the secure data from the memory via the interface,
- the processor configured so as always not to respond to an attempt to re-program the processor at run-time, and
- the processor arranged to operate on a memory configured to store information associated with a plurality of independent users, wherein the memory is a non-transitory storage medium, wherein the memory comprises flash memory organized as a hash table for storing secure data, the flash memory being organized as a single uniform space of blocks, each of which accommodates a user profile.

13. A computer implemented method according to claim 12, wherein the limited number of pre-determined operations include updating the secure data and the method further comprises receiving a message from an application server with data to be protected from unauthorized access and updating the memory with the received data.

14. A computer implemented method according to claim 12 further comprising providing the secure data in encrypted form to an external back-up device via an interface that is separate from an interface over which messages are exchanged with the application server.

15. A non-transitory computer readable medium having executable instructions stored thereon that are executable by a processor, the instructions executable to cause the processor to:
(i) receive and interpret a message received via an interface from an application server configured to use an apparatus comprising the processor to protect data associated with a plurality of users, the message comprising data received by the application server from another device, the message comprising data associated with one of the plurality of independent users;
(ii) carry out a limited number of predetermined operations on the memory storing the information comprising data associated with the plurality of users wherein the information is kept secure from unauthorized access, wherein the limited number of operations comprise comparing data based on the received data against secure data stored in memory; and
(iii) provide a response back to the application server, via the interface, based on results of operations of the limited number of predetermined operations, wherein the limited number of operations do not include returning secure data to the application server,
(iv) not respond to a request to extract the secure data from the memory via the interface, and
(v) not respond to an attempt to re-program the processor at run-time.
wherein the processor arranged to operate on a memory configured to store information associated with a plurality of independent users, wherein the memory is a non-transitory storage medium, wherein the memory comprises flash memory organized as a hash table for storing secure data, the flash memory being organized as a single uniform space of blocks, each of which accommodates a user profile.

\* \* \* \* \*